United States Patent
Bohannan et al.

[11] Patent Number: 5,230,590
[45] Date of Patent: Jul. 27, 1993

[54] INDEXABLE INSERT FOR THREAD CUTTING AND SLOTTING

[76] Inventors: Richard D. Bohannan, Box 203; Reinar Schmidt, Box 149, both S-771 01 Ludvika, Sweden

[21] Appl. No.: 777,334
[22] PCT Filed: May 31, 1990
[86] PCT No.: PCT/SE90/00379
  § 371 Date: Nov. 27, 1991
  § 102(e) Date: Nov. 27, 1991
[87] PCT Pub. No.: WO90/14916
  PCT Pub. Date: Dec. 13, 1990

[30] Foreign Application Priority Data
May 31, 1989 [SE] Sweden .................. 8901968

[51] Int. Cl.⁵ ............................. B23B 27/16
[52] U.S. Cl. ..................... 407/113; 407/107; 407/117
[58] Field of Search ........... 407/99, 100, 102, 103, 407/114, 113, 107

[56] References Cited
U.S. PATENT DOCUMENTS

| | | | |
|---|---|---|---|
| 2,551,948 | 5/1951 | Hutchinson | 407/102 X |
| 3,859,700 | 1/1975 | Jilbert | 407/103 |
| 4,028,782 | 6/1977 | Stansak | 407/113 |
| 4,087,194 | 5/1978 | Takacs et al. | 407/100 X |
| 4,201,501 | 5/1980 | Day | 407/100 X |
| 4,509,886 | 4/1985 | Lindsay | 407/102 |
| 4,602,897 | 7/1986 | Teets | 407/113 |

Primary Examiner—Steven C. Bishop
Attorney, Agent, or Firm—Watson, Cole, Grindle & Watson

[57] ABSTRACT

In thread cutting and slotting, indexable inserts of hard metal are now used. Usually, the inserts used have been of triangular type. In order to improve cutting economy, implying improved positioning, closer tolerances, and increased strength, an insert (1) has been developed for use in, for example, internal thread cutting, said insert (1) being formed with two cutting edges (2, 2') on a bevelled cutting body (1, 3). Since the cutting body (1) is located on a cutting column (10), the cross section of which is symmetrical, the insert with the cutting body (1) and the cutting column (10) may be reversed half a turn with essentially retained directional geometry. The insert (1, 10) has a plurality of plane guiding and contact surfaces (5, 5', 6, 6', 14, 14') adapted to match the corresponding plane guiding and contact surfaces in an insert holder (13) in order to achieve correct positioning of the indexable insert in the insert holder.

2 Claims, 3 Drawing Sheets

INDEXABLE INSERT FOR THREAD CUTTING AND SLOTTING

The present invention relates to indexable inserts for thread cutting and slotting to be used, for example, in internal thread cutting of workpieces by means of automatically controlled machine tools.

PRIOR ART

There are different methods of making threads and slots, involving either plastic machining or machining by means of cutting of a blank of, for example, screw or nut type. The most frequent method for producing threads for screws, bolts and nuts is plastic machining by means of thread rolling, in which the thread profile is pressed into the surface of the material. Machining by means of cutting comprises the following methods: use of threading taps and threading dies, thread milling, grinding and chasing. In thread chasing, the thread is cut into the rotating workpiece by means of a tool edge such as a cutting insert, suitably of indexable type, clamped in an insert holder. With modern NC and CNA lathes/machine tools, threads can be made quickly and efficiently using cutting inserts and holders for same. The counterpart of the thread cutting of a workpiece is an ordinary turning operation, in which the feeding per revolution corresponds to the thread pitch. The pointed end of the indexable insert is usually cut to a profile intended to correspond to, for example, the space between two thread sides. The chip cutting thickness is determined by the cutting depth. The feeding movement of the tool must be related to the rotary movement of the work spindle. Often, a feeding function as such is provided in the lathe. An operator or a computer monitors and controls the actual threading.

Indexable inserts for thread cutting and slotting have been available on the market since the early 1960s. Mainly, triangular cutting inserts of positive or negative cut type have been used for horizontal as well as vertical mounting in the insert holder. There are certain disadvantages associated with a cutting insert of this type, since it may be difficult to locate the insert accurately in the holder and there is a risk of insert rupture. As a result of the development as regards equipment, greater demands have to be made as to locating tolerances, and improved built-in safety as regards insert rupture must be demanded, especially in view of the use of unmanned converting machines in continuous operation. Owing to the large investments in equipment required today, cutting economy has become an issue of ever greater importance to companies.

DESCRIPTION OF THE INVENTION

In order to improve cutting economy, the indexable insert according to the invention for internal thread cutting and slotting is provided with two cutting edges at the ends of a bevelled cutting body. A cutting column with symmetrical cross section relative to an axial section through the central axis of the column is connected with the cutting body, thus allowing the cutting insert to be reversed half a turn, if required, for continued use of the cutting insert. The cutting column has a plurality of limiting surfaces with parallel intersecting lines, which contributes towards great accuracy as regards location and orientation when mounting the cutting insert in the holder. With this design, much closer tolerances are possible than in the case of other types of cutting inserts. Owing to the cutting body between the cutting edges having been given an elongated shape, the cutting forces will act on the cutting insert within a larger angular area as compared to previous solutions, and the forces and the heat will be absorbed more efficiently in the whole of the cutting insert including the cutting body and column, whereby the risk of a cutting insert rupture is considerably reduced. Further, since the cutting body supports two cutting edges in a line which can be ground at the same time, an improvement in production technique is achieved.

DESCRIPTION OF AN EMBODIMENT

Figure 1A:
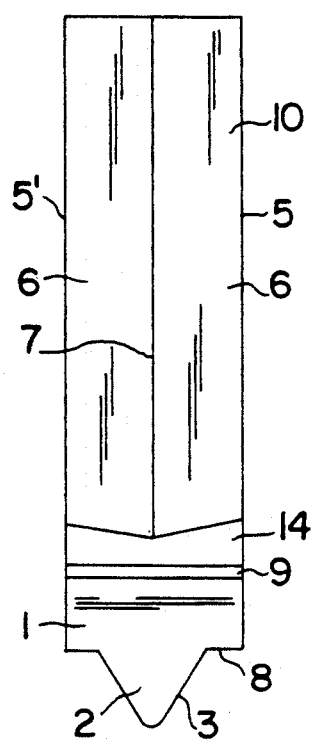
FIG. 1 shows different views of a cutting insert comprising a cutting body and a cutting column according to the invention, FIG. 1A being a longitudinal side view, FIG. 1B being a longitudinal side view perpendicular to FIG. 1A, and FIG. 1C being a top view of the insert.
Figure 1B:
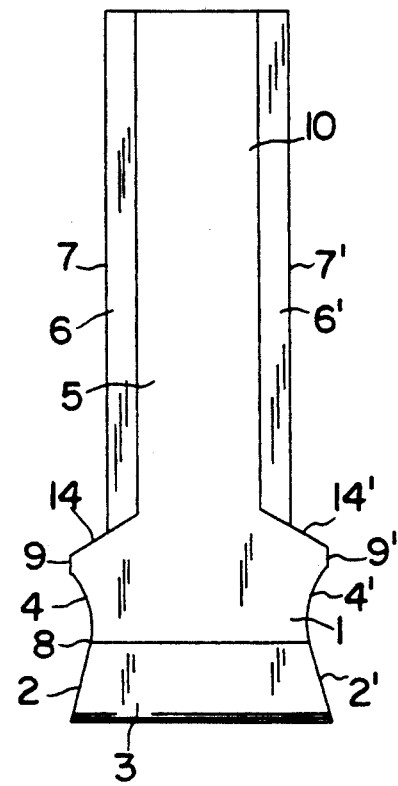
Figure 1C:
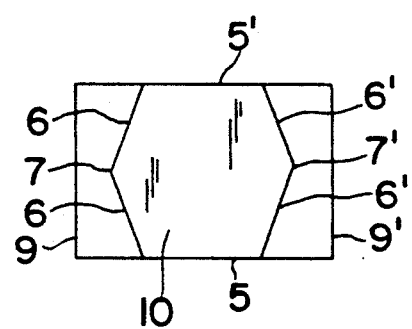
Figure 2:
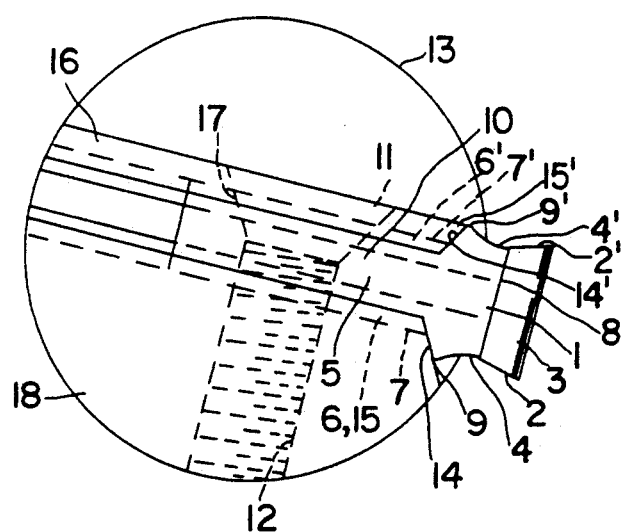
FIG. 2 is an end view of the cutting insert mounted in the holder.
Figure 3A:
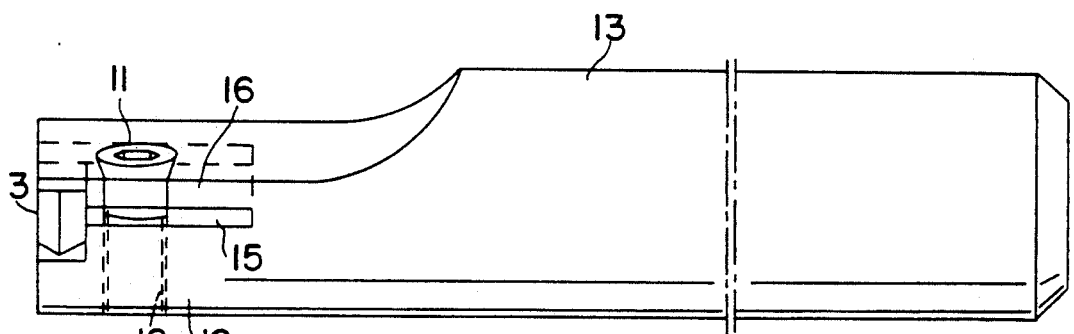
FIG. 3 shows a side view and a top view of the insert holder and cutting insert FIG. 3A being a longitudinal side views of the insert from one side, and FIG. 3B being a longitudinal side view perpendicular to FIG. 3A.
Figure 3B:
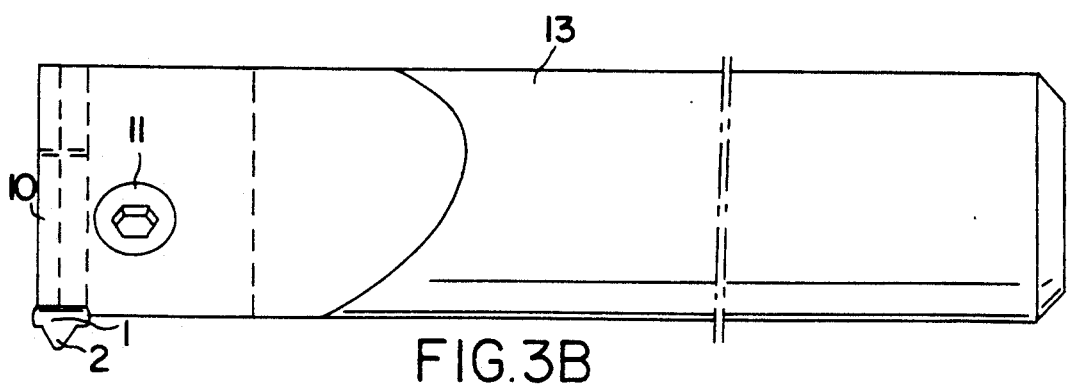
Figure 4:
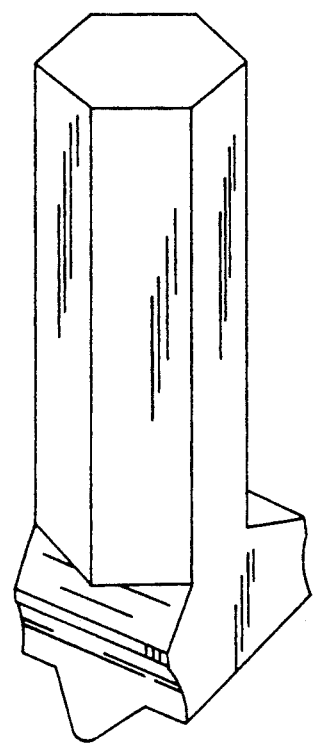
FIGS. 4 and 5 are respective bottom and top perspective views of the cutting insert of FIGS. 1-3.
Figure 5:
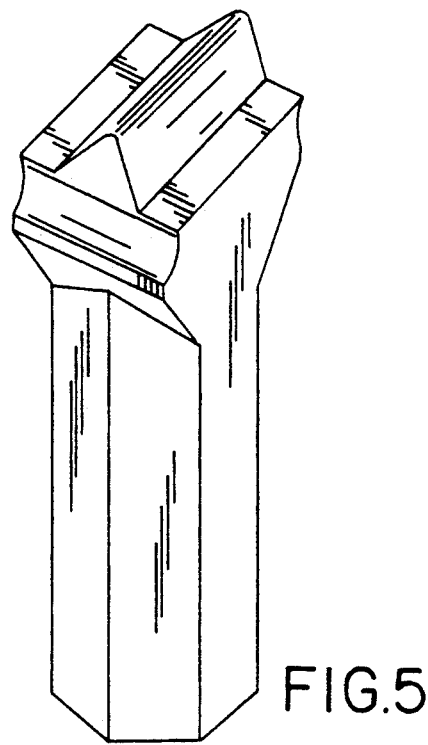

A cutting insert according to the invention comprises a cutting column 10 and a cutting body 1 of hard metal connected with the cutting column. The cutting body (head) 1 supports a bevelled portion 3 with two cutting edges 2 at each end, the cutting edges being oriented in opposite directions. The bevelling angle and shape was chosen in consideration of the profile to be cut. Adjacent the cutting edges 2, the cutting body is provided with chip breakers/deflectors 4, 4'. Inside the cutting edges with the bevelled portion 3 of the cutting body 1 there is an end face 8. Between the guiding edges 9, 9' of the cutting body 1 and the cutting column 10 there are intermediate bevelled/inclined guiding and contact surfaces 14, 14' for accurate angular adjustment and positioning of the insert 1, 10 relative to the corresponding guiding and contact surfaces of the insert holder 13. The cutting column 10 is provided with a plurality of longitudinally disposed guiding and contact surfaces 5, 5', 6, 6' with parallel intersecting lines, these guiding and contact surfaces together with the corresponding guiding and contact surfaces of the insert holder also contributing towards the correct positioning of the insert 1, 10. With all these guiding and contact surfaces of the insert and the holder, positioning of the insert can be made very accurately, at the same time as the shape of the insert with the bevelled cutting head and the two cutting edges makes it possible to locate the cutting edges differently by reversing the insert with retained accurate positioning. By inclining the insert in the holder (see FIG. 2), for example 15° relative to a workpiece, both the upper and under side of the cutting head, i.e. both cutting edges, may be used in the machining of a workpiece. For holding the insert 1, 10, the insert holder 13 is provided with a slot 15 which delimits a tab portion 16. The outer end of the insert holder 13 and the outer end of the tab portion 16 are provided with guiding and contact surfaces matching the cutting column 10. In the tab portion there is a conical bore 17 into which a suitable screw head will fit and which is concentric with a threaded bore 12 in the insert holder.

By means of a screw 11, such as a socket head cap screw, the inserted cutting insert on tightening is clamped between the tab portion 16 and the lower part 18 of the insert holder.

What is claimed is:

1. A hard metal indexable insert for thread cutting or slotting and which is reversibly insertable in an insert holder, said insert comprising a column and a cutting head at one end of said column, said column defining flat outer guide surfaces along a length thereof and said cutting head defining first and second pairs of opposite side faces and an end face, each side face of said first pair of opposite side faces defining a peak guiding edge and a contact surface portion which extends from said shaft to said peak guiding edge, and said end face defining first and second end surface portions and a bevelled, elongated protrusion therebetween, said bevelled, elongated protrusion extending across said end face between said first pair of opposite side faces and defining cutting edges at opposite ends thereof.

2. The indexable insert of according to claim 1, wherein said column has a hexagonal cross section, thus defining six flat outer guide surfaces; wherein said faces of said second pair of opposite faces of said cutting head are flat, and wherein a pair of opposite flat outer guide surfaces of said column are coplanar with said flat faces of said second pair of opposite faces of said cutting head.

* * * * *